United States Patent
Spahr

(10) Patent No.: US 8,696,213 B2
(45) Date of Patent: Apr. 15, 2014

(54) HUB, IN PARTICULAR FOR BICYCLES

(75) Inventor: Stefan Spahr, Lengau (CH)

(73) Assignee: DT Swiss Inc., Grand Junction, CO (US)

( * ) Notice: Subject to any disclaimer, the term of this patent is extended or adjusted under 35 U.S.C. 154(b) by 729 days.

(21) Appl. No.: 12/428,167

(22) Filed: Apr. 22, 2009

(65) Prior Publication Data

US 2009/0274406 A1 Nov. 5, 2009

(30) Foreign Application Priority Data

Apr. 30, 2008 (DE) .......................... 10 2008 021 803

(51) Int. Cl.
*F16C 13/00* (2006.01)

(52) U.S. Cl.
USPC ....................................... 384/545; 301/110.5

(58) Field of Classification Search
USPC ......... 384/457, 458, 504, 512, 535, 536, 545; 301/110.5
See application file for complete search history.

(56) References Cited

U.S. PATENT DOCUMENTS

| | | | | |
|---|---|---|---|---|
| 2,731,214 A * | 1/1956 | Bogar | ............................ | 242/229 |
| 4,768,761 A * | 9/1988 | Kramer | ........................... | 267/154 |
| 5,181,437 A * | 1/1993 | Chi | .............................. | 74/594.1 |
| 5,383,729 A * | 1/1995 | Hsieh | ............................. | 384/545 |
| 5,553,950 A * | 9/1996 | Pawsat et al. | ................. | 384/545 |
| 5,575,540 A * | 11/1996 | Chi | ............................. | 301/110.5 |
| 5,690,395 A * | 11/1997 | Hicks | ........................ | 301/105.1 |
| 5,762,426 A * | 6/1998 | Lin | ................................ | 384/458 |
| 6,014,913 A * | 1/2000 | Masahiro | ..................... | 74/594.1 |
| 6,116,114 A * | 9/2000 | Edwards | ...................... | 74/594.1 |
| 6,212,774 B1 * | 4/2001 | Ohtsu | ....................... | 29/898.063 |
| 6,478,128 B2 * | 11/2002 | Taylor | ............................ | 192/64 |
| 6,557,684 B1 * | 5/2003 | Jäger et al. | ...................... | 192/64 |
| 6,817,773 B2 * | 11/2004 | Wang | ............................ | 384/545 |
| 6,907,972 B2 * | 6/2005 | Chen | .............................. | 192/64 |
| 6,938,964 B2 * | 9/2005 | Flood et al. | .................... | 301/119 |
| 7,234,373 B2 * | 6/2007 | Yamanaka | ................... | 74/594.1 |
| 7,360,952 B2 * | 4/2008 | Kanehisa et al. | ............. | 384/545 |
| 7,441,842 B2 * | 10/2008 | Watarai et al. | ............. | 301/110.5 |
| 7,650,817 B2 * | 1/2010 | Shiraishi et al. | ............. | 74/594.1 |
| 7,758,250 B2 * | 7/2010 | Kanehisa et al. | ............. | 384/545 |
| 2007/0194620 A1 * | 8/2007 | Kanehisa | ................... | 301/110.5 |

FOREIGN PATENT DOCUMENTS

DE 91 13 955.4 2/1992

* cited by examiner

*Primary Examiner* — Gregory Binda
*Assistant Examiner* — Nahid Amiri
(74) *Attorney, Agent, or Firm* — Greer, Burns & Crain, Ltd.

(57) ABSTRACT

A hub, in particular for bicycles having a hub shell and two bearings received therein on bearing seats for rotatably supporting relative to a through axle, wherein the two bearings are retained at a defined axial distance by means of a sleeve. A radial spacer device is provided to reduce radial play of the sleeve in the hub shell and to facilitate inserting the through axle.

14 Claims, 3 Drawing Sheets

HUB, IN PARTICULAR FOR BICYCLES

BACKGROUND

The present invention relates to a hub, in particular also for bicycles. The hub according to the invention is in particular suitable to be employed in a front wheel hub equipped with a through axle.

Hubs have become known in the prior art and in particular hubs for front wheels comprising through axles. These hubs comprise a hub shell at each end of which a bearing is received in a bearing seat. To retain the inner bearing rings at a defined distance, a sleeve is positioned between the inner bearing rings to retain the inner bearing rings at a defined axial distance from one another.

During mounting, the through axle is inserted through the inner bearing ring on one face of the hub. Thereafter the through axle must be passed through the sleeve which serves as a spacer between the bearings. The sleeve is configured with the thinnest feasible wall to save unnecessary weight. This is why the sleeve, which in a non-mounted state tends to be loosely arranged, rests on what is currently the radial bottom of the internal hub shell wall. This is why the through axle cannot be readily inserted into the sleeve because in this state the sleeve is not centered, the upper sleeve wall impeding insertion of the through axle.

To allow inserting the through axle into the sleeve, the user must therefore insert his finger or a tool into the hub from the other side, centering the sleeve in the hub shell such that the through axle can be inserted into the sleeve through the centrally disposed opening.

In particular since the entire front wheel must often be conveniently aligned relative to the dropouts of the front wheel fork, such sleeve alignment is a awkward additional action, unnecessarily time-demanding and often involving a number of attempts or a suitable tool.

One solution to this problem may be, to dispense with a through axle, employing instead a so-called hollow axle on which the bearings are arranged and through which a quick release or the like is passed for fastening the hub and the wheel to the fork.

These wheels with hollow axles operate reliably and have been used for a long time. In particular in mountain-biking, however, high or extremely high lateral loads as well as torsional loads on the wheel tend to occur. This is why a particularly high rigidity of the wheel is desired. For this purpose, through axles generally offer the advantage of a higher lateral rigidity.

Against the described background of the prior art it is therefore the object of the present invention to provide a hub, in particular for a bicycle, which allows greater ease of mounting while employing a through axle.

SUMMARY

The hub according to the invention is in particular provided to be employed in bicycles and the inventive hub serves particularly preferably as a front wheel hub. The hub comprises a hub shell and at least two bearings received therein on bearing seats to rotatably support the hub shell relative to a through axle. The two bearings are axially spaced apart from one another by means of a sleeve. At least one radial spacer device is provided to reduce the radial play of the sleeve in the hub shell and to facilitate inserting the through axle.

The hub according to the invention has many advantages. It is one considerable advantage of the inventive hub that employing a through axle ensures high rigidity of the hub, while on the other hand allowing ease of mounting by way of the at least one spacer device. The radial spacer device considerably reduces the radial play of the sleeve relative to the hub shell such that when not mounted, the through axle can be passed through a bearing and inserted into the sleeve with minor effort.

At the same time the overall weight which is significant in the field of bicycle hubs is virtually not increased since the radial spacer device can be configured very lightweight. The radial spacer device serves to facilitate inserting the through axle through the sleeve. It does not serve for transmitting any radial or axial forces so as to allow lightweight materials, thin walls, and thus a low weight of the spacer device.

Advantageously the spacer device is arranged so as to allow a non-contact rotation of the hub shell around the sleeve in operation. Since the sleeve serves to keep the inner bearing rings axially spaced apart from one another, the sleeve is stationary in operation as is the through axle, while the hub shell rotates about the stationary through axle and the sleeve. A rubbing contact would result in abrasion long-term, impairing the hub function.

By way of the radial spacer device, defined conditions are set which considerably facilitate inserting the through axle.

The radial play between the sleeve and the hub shell is reduced by way of one, two, or several radial spacer devices so as to allow easy insertion of the through axle.

In a preferred specific embodiment the sleeve is configured as a substantially tubular, hollow body. The sleeve is in particular configured with thin walls to not unnecessarily increase the total hub weight.

In a preferred specific embodiment at least one spacer device is positioned at the sleeve. Preferably at least one radial spacer device is positioned on the radial outside of the sleeve. The spacer device may for example be configured as a separate component which is mounted on the outside of the sleeve e.g. during mounting.

Or else it is conceivable to configure the spacer device integrally with the sleeve such that the spacer device, being part of the sleeve, radially protrudes from the sleeve body in one defined or in several defined points to reduce radial play.

Preferably the spacer device is configured as a separate component. The spacer device may for example be configured as a ring or a disk, being slipped over the sleeve in the axial direction to serve as a spacer and when the hub is not mounted to a fork, to facilitate inserting the through axle during mounting.

Preferably the spacer device comprises at least one annular body which may in particular consist of a flexible material. It is particularly preferred for the annular body to consist of a lightweight material, rubber, plastic, felt, or the like. Annular bodies of these materials are low in weight while fulfilling the desired function. Or else it is conceivable for a ring of a light metal or the like to be provided on the sleeve.

To ensure durable function even in the case of repeatedly mounting and demounting, the annular body may be guided in a groove on the outside of the sleeve or the inside of the hub shell so as to reliably prevent axial displacement of the annular body.

To arrange the spacer device on the sleeve as a separate component offers advantages over integral manufacture since machining is much simpler. The sleeve does not require to be machined so as to leave a radial spacer device remaining but a separate spacer device may be slipped onto the sleeve or inserted into the hub shell. Machining one or two grooves on the sleeve is much simpler than machining the sleeve so as to have a radial spacer device remaining.

In all of the configurations it is conceivable for the spacer device or the at least one spacer device to be positioned on and/or attached to the hub shell. For example a spacer device may be positioned on the radially inner peripheral surface of the hub shell, being configured as a disk having a corresponding through hole, or as a ring.

It is preferred for all of the configurations that at least one spacer device is configured as an O-ring which is in particular placed in an outside groove on the sleeve, or inserted in an inside groove of the hub shell.

It is particularly preferred for the spacer device to be provided on the sleeve since such a configuration allows easy retrofitting of existing hubs. A simple replacement of an axial spacer sleeve by the sleeve equipped with a radial spacer allows to considerably facilitate the mounting of existing hubs.

Advantageously the hub comprises a through axle which is supplied with the hub and in particular comprises a chamfered edge on one insertion end to facilitate inserting. In particular, a radial extension of the spacer device, an inner or smaller diameter of the chamfered edge, and an internal diameter of the sleeve are matched to one another such that the insertion end can be inserted into the sleeve lying inside the hub shell.

A radial extension of the spacer device is preferably dimensioned such that the chamfered edge of the insertion end can be inserted into the sleeve which lies in the hub shell.

Preferably an adapter ring is provided at least on one axial face of the hub shell. It is particularly preferred that an adapter ring is provided on each of the two axial end faces of the hub shell and inserted in the hub shell with one portion and bearing against the inner bearing ring and supporting the inner bearing ring in the axial direction.

The adapter rings are in particular axially inserted in the hub shell so as to allow particular ease of demounting.

It has been found that in demounting a wheel the axial adapter rings can fall out of the hub shell as the through axle is removed. This is in particular intensified because the adapter ring must have a certain radial play relative to the hub shell to avoid that the stationary adapter ring comes into rubbing contact with the rotating hub shell.

In preferred more specific embodiments each adapter ring is preferably provided with a retaining means to retain the adapter ring to the hub shell even after removing the through axle.

Preferably the retaining means consists of a light metal or of plastic, being in particular annular in shape. It is particularly preferred for at least one retaining means to be pressed or screwed into one axial face of the hub shell. Such a retaining means reduces the clear diameter at the end of the hub shell such that the adapter ring can no longer be pulled out through the remaining opening. In this way the adapter ring is secured to the hub shell. At the same time the dimensions of the retaining means and of the adapter ring are chosen so as to allow no-contact operation.

BRIEF DESCRIPTION OF THE DRAWINGS

Further advantageous applications and features of the present invention ensue from the exemplary embodiments which will now be described with reference to the Figures.

The figures show in.

DETAILED DESCRIPTION

Figure 1:
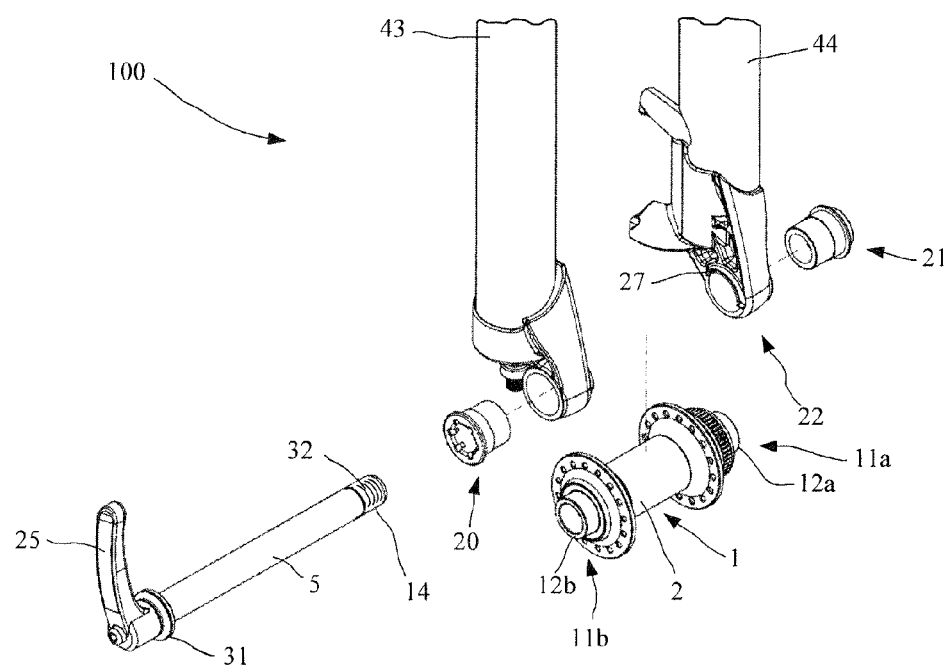
FIG. 1 a perspective, exploded view of a front wheel hub on a bicycle fork.

With reference to the FIGS. 1 to 4, two exemplary embodiments of the present invention will now be described.

The hub 1 according to the invention is in particular configured as a front wheel hub and may be employed in a suspension fork 100. The suspension fork 100 illustrated in FIG. 1 only in part and schematically in an exploded view comprises stationary tubes 43 and 44 with bottom dropouts 22 where bushings 20 and 21 are inserted into the stationary tubes 43 and 44.

To mount the hub 1 to the suspension fork 100, a wheel—not shown—is held with its hub 1 between the bushings 20 and 21 and the through axle 5 is inserted with its insertion end 14 through the bushing 20 into the hub shell 2 of the hub 1 and screw-fastened by means of the quick release lever 25 so as to result in a secure seat of the hub 1 or the wheel in the front wheel fork 100. The knurled disk 31 contributes to securing the connection.

Figure 2:
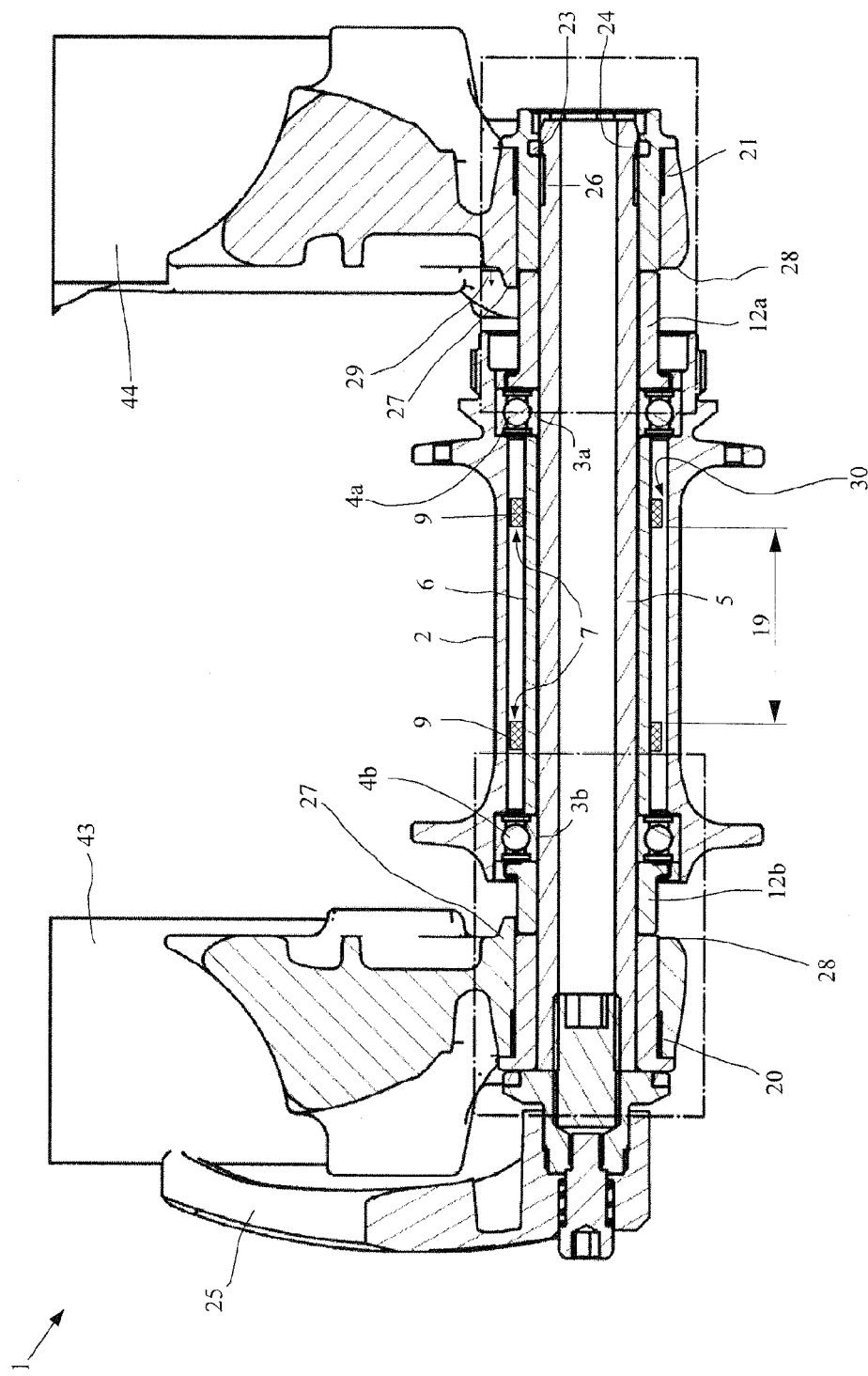
FIG. 2 a sectional view of the front wheel hub according to FIG. 1.

The hub 1 from FIG. 1 is illustrated in FIG. 2 in section. As is typical for these hubs 1 provided for through axles 5, the hub 1 comprises an inner sleeve 6 which serves as an axial spacer for the pair of bearings 4a and 4b. In the absence of such an axial spacer in the form of a sleeve 6, the inner bearing rings of the bearings 4a and 4b would be axially displaced inwardly due to lateral forces.

Since the through axle 5 is disposed radially immediately inside the inner bearing seats 3a and 3b of the bearings 4a and 4b, the sleeve 6 which is formed as a separate part rests on what is currently the bottom internal wall 42 (see FIG. 4) of the hub shell 2, when not mounted.

In a conventional hub this results in the upper portion of the sleeve wall 46 lying so deep in the insertion opening 47 that the sleeve impedes an insertion of the through axle from the face 11b.

To solve this problem the user must use a tool or his finger, inserting it into the hub from the other face 11a, lifting and centering the sleeve 6 so as to be able to insert the insertion end 14 of the through axle 5 into the sleeve 6. Since the user must often also position the entire front wheel such that he can insert the through axle 5 into the adapter rings 12a and 12b respectively, the user is expected to employ quite some effort of coordination. This is time-consuming and may be annoying.

The invention offers the advantage that the radial spacers 7, which are in particular configured as annular bodies 9, cause the radial play 8 of the sleeve 6 to be considerably reduced from the original radial distance which is the sum of the distances 18 and 37, to the radial play 8. The proportional reduction of play may amount to 30, 50, 75 percent or a still higher percentage, depending on the specific application.

The sleeve 6 is lifted by the radial spacers 7 each configured as an O-ring 17 in the exemplary embodiment according to FIG. 1, such that the insertion end 14 can be inserted into the inner diameter 34 of the sleeve 6 by the chamfered edge 15, without any other tool.

What is important is that the sleeve 6 which when not mounted is resting on the radially lower inside 42 of the hub shell 2 is centered by means of the spacers 7 so as to allow trouble-free insertion of the through axle 5.

Figure 4:
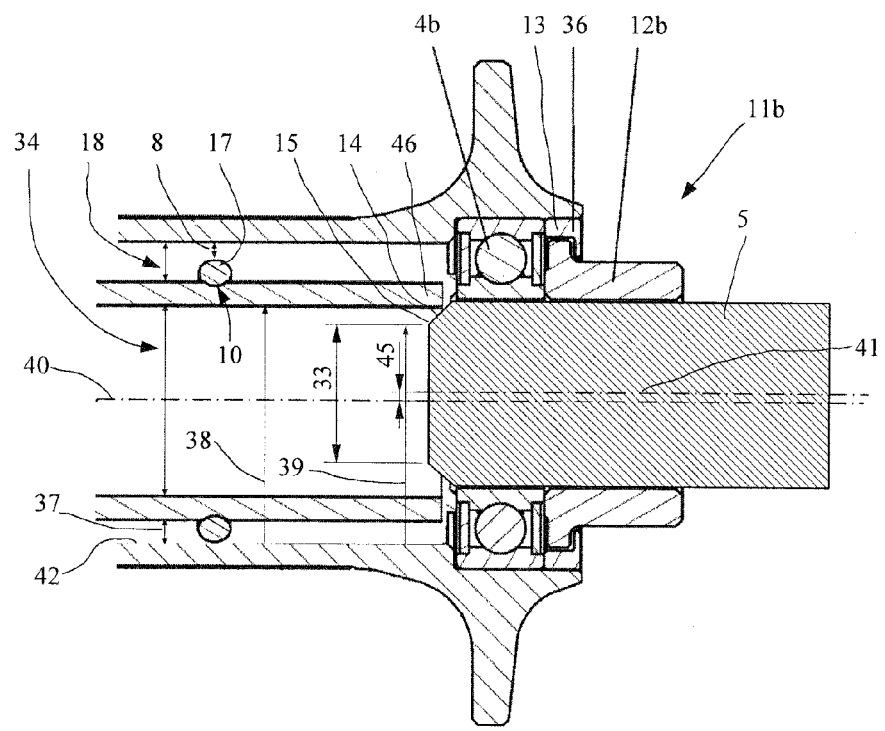
FIG. 4 a schematic illustration of the insertion procedure for a through axle into a hub according to the invention.

To this end the sleeve 6 must he positioned such and comprise clear dimensions so as to allow insertion of the chamfered edge 15 of the insertion end 14 of the through axle 5. This is schematically illustrated in FIG. 4. It is fulfilled in practice e.g. in the simple case that the chamfered edge 15 having the inner diameter 33 and the clear inner diameter 34 of the sleeve 6 are matched to one another accordingly.

The height 38 from the lower inner peripheral surface 42 of the hub shell 2 to the upper sleeve wall 46 of the sleeve 6 must be larger than the height 39 from the inner peripheral surface 42 of the hub shell 2 to the top edge of the chamfer 15. With the radial play 8 reduced to this degree, ease of insertion of the through axle 5 into the hub and into the sleeve 6 is ensured. When mounted, the operational distance 30 corresponds to half the radial play 8.

In other words, the distance 45 of the center axis 40 of the sleeve 6 from the center axis 41 of the bearings 4a, 4b or from the through axle 5 to be inserted must be smaller than the radial extension of the chamfer 15 so as to allow the insertion end 14 to be introduced in the inner diameter 34 of the sleeve 6 by the chamfered edge 15.

All of the embodiments in particular employ two radial spacer devices 7 which are axially spaced apart by a distance 19. The larger the distance between the radial spacer devices 7 from one another, the smaller the risk of the sleeve tilting. Preferably the radial spacer devices 7 are provided as far as possible axially outwardly to establish defined conditions.

Figure 3:
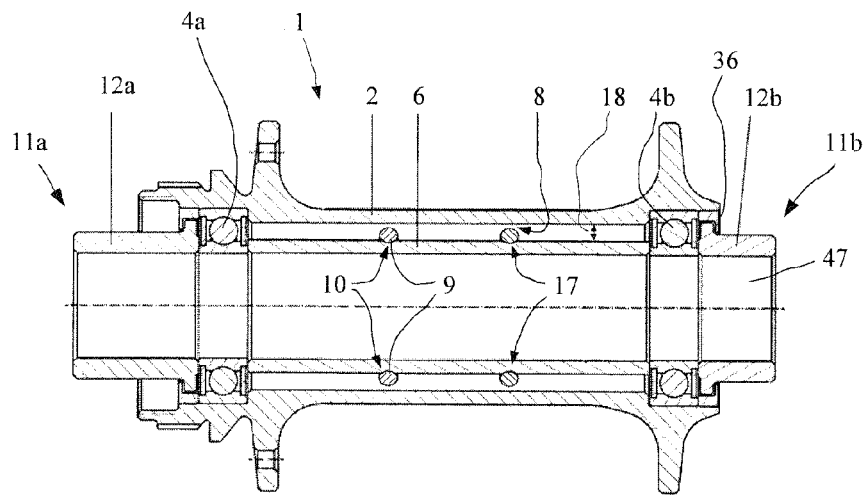
FIG. 3 a sectional view of another hub according to the invention.

As illustrated in FIGS. 3 and 4, the radial spacer devices 7 may be configured as O-rings 17 and axially secured in grooves 10 on the outside of the sleeve 6. Or else it is conceivable for the radial spacer devices 7 to be an annular strip or the like, extending around the sleeve 6. The annular strip may be stuck onto the sleeve or fastened in any other way.

Another insertion aid provided in the exemplary embodiment is a projecting edge 27 on the suspension fork which in a normal operating condition is provided above and slightly spaced apart from the adapter rings 12a or 12b. For inserting the through axle 5 in the hub 1, the suspension fork 100 with the projecting edges 27 can be placed onto the adapter rings 12a and 12b. In this position the chamfer 15 ensures at their insertion ends 14 easy pushing of the through axle 5 into the respective adapter rings 12a or 12b. On the whole there is provided ease of mounting a wheel and the hub 1 to a fork or else to a suspension fork 100.

To fasten the through axle 5 to the suspension fork 100, a threaded portion 32 of the through axle 5 is screwed to a corresponding thread 26 at the sleeve 21 in the dropout 22 of the suspension fork 100. An O-ring 24 in a groove 23 provides a sealing means to thus protect the thread 26 from dust and water.

Above the through axle 5, axial appendages or projecting edges 27 are provided on the two stationary tubes 43, 44, each projecting axially inwardly by a length or width 29, forming end bearings on which a wheel or a hub 1 may be placed for example with the bicycle positioned upside down.

This facilitates inserting and threading of the through axle 5 into the opening in the bushings 20 and 21 since the hub is basically already held in the intended position. A small radial distance may be present which may be for example 0.5 or 1 mm, to avoid contact of the outside of the hub and the stationary tubes 43 or 44. Nevertheless the hub 1 is already approximately in the correct position so as to considerably facilitate threading in.

Threading in is likewise facilitated when the fork is placed on the wheel which is stood upright on the ground since the projecting edges 27 likewise ensure good pre-positioning of the suspension fork 100 relative to the hub 1.

In a non-mounted state the adapter rings 12a and 12b are secured against unintended dropping out by means of the retaining devices 13 configured as closing caps 36. One closing cap 36 each is pressed into one of the faces 11a or 11b.

Each closing cap 36 comprises a through hole through which the axial end of the corresponding adapter ring 12a or 12b extends, projecting outwardly. Removing the adapter ring from the hub shell 2 requires for the corresponding closing cap 36 to be removed first. The closing caps 36 may consist of a light metal or else of plastic or the like. When mounted, the closing caps 36 have a specific clear distance from the adapter ring which may be small. Absence of contact is significant since the closing caps 36 are rotatingly driven with the hub shell, while the adapter rings 12a, 12b are stationary when mounted.

While the top sides of the dropouts 22 are provided with the projections or projecting edges 27 extending axially inwardly, the bottom sides may be provided with axial recesses 28 at the dropouts 22 such that the axial distance between the stationary tubes is larger at the lowermost end of the stationary tubes 43 and 44 than in the region of the projecting edges 27. This facilitates both mounting and demounting. One advantage of this is that when inserting a hub 1 or a wheel from beneath, the dropouts 22 are protected better from a contact with the hub 1 since the available width is considerably larger than necessary. In this way, wear and damage to the lower ends of the stationary tubes 43 and 44 occurring in mounting and demounting the wheels is largely avoided such that service life is extended.

The invention claimed is:

1. A hub for a bicycle wheel comprising:
a hub shell;
a through axle configured to support said hub shell;
a sleeve positioned between said hub shell and said through axle;
at least two bearings received on bearing seats in the hub shell for rotatably supporting the hub shell relative to said through axle, wherein the at least two bearings are axially spaced apart from one another and are retained at a defined axial distance by said sleeve, wherein said sleeve is positioned between said at least two bearings and extends from one of said at least two bearings to said other of said at least two bearings; and
at least two radial spacers provided on said sleeve between said sleeve and said hub shell to reduce the radial play of said sleeve in the hub shell, said at least two radial spacers being axially spaced from each other.

2. The hub according to claim 1, wherein the sleeve is configured as a substantially tubular, hollow body.

3. The hub according to claim 1, wherein said at least two spacers comprise at least two annular bodies.

4. The hub according to claim 3, wherein the annular bodies are guided in grooves defined by said sleeve.

5. The hub according to claim 3, wherein the annular bodies consist of a flexible material.

6. The hub according to claim 3, wherein the annular bodies include at least one of: rubber, plastic, felt and a light metal.

7. The hub according to claim 1, wherein said through axle comprises a chamfered edge at an insertion end to facilitate inserting said axle through said sleeve.

8. The hub according to claim 7, wherein a radial extension of each of the spacers, an inner diameter of the chamfered edge, and an internal diameter of the sleeve are matched to one another such that the insertion end is inserted into the sleeve lying inside the hub shell.

9. The hub according to claim 7, wherein a radial extension of each of the spacers is dimensioned such that the chamfered edge of the insertion end is inserted into the sleeve lying inside the hub shell.

10. The hub according to claim 1, wherein at least one axial end face of said hub shell is provided with an adapter ring.

11. The hub according to claim 1, wherein at least one adapter ring is retained by a retaining device fastened to the hub shell.

12. The hub according to claim 11, wherein the retaining device consists at least in part of a light metal or plastic.

13. The hub according to claim 11, wherein the retaining device is pressed or screwed into the end face of the hub shell.

14. The hub according to claim 1, wherein said sleeve is a designated distance from said hub shell, each of said at least two spacers having a height that is less than said designated distance.

* * * * *